W. W. NEIGHBOUR.
FRUIT-BOX.

No. 173,175.  Patented Feb. 8, 1876.

Witnesses:
William Frank Bogart
Edmund G. Gill

Inventor:
William W. Neighbour

UNITED STATES PATENT OFFICE.

WILLIAM W. NEIGHBOUR, OF CHICAGO, ILLINOIS.

IMPROVEMENT IN FRUIT-BOXES.

Specification forming part of Letters Patent No. 173,175, dated February 8, 1876; application filed May 28, 1875.

*To all whom it may concern:*

Figure 1:
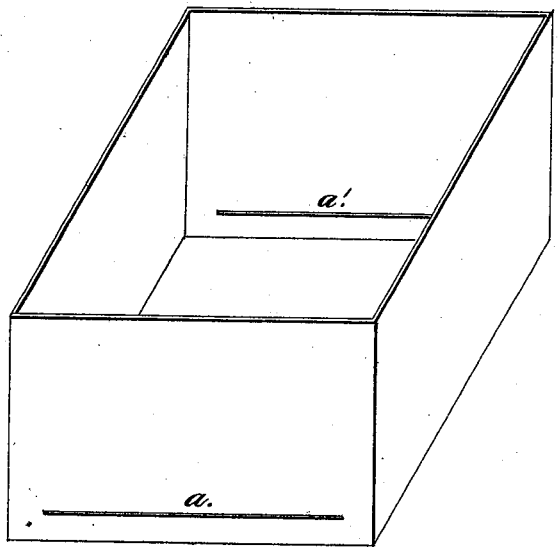
Figure 2:
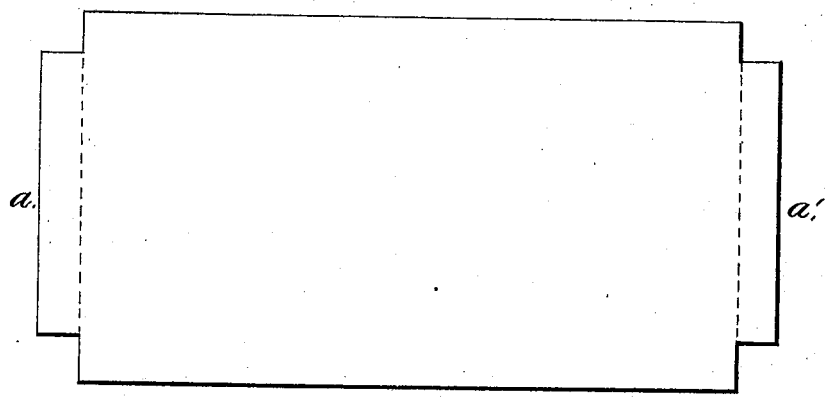

Be it known that I, WILLIAM W. NEIGHBOUR, of the city of Chicago, in the county of Cook and State of Illinois, have invented a Fruit-Box, of which the following is a specification:

The nature of my invention consists in making boxes for holding fruit of water-proof pasteboard or paper, (I prefer that known as plastering-paper or inodorous sheathing,) in the following manner, viz: The body of the box is to be made of one piece of water-proof pasteboard or paper, bent in the form or shape required, the ends being fastened by lapping and stitching, tacking, or gluing them together. About one-half inch from the bottom of the box cuts or slits $a$ $a'$ are to be made in two of the opposite sides, as shown in Figure 1 of the accompanying drawing. The bottom of the box is of a single piece of the same material, with notches cut in the edges, as shown in Fig. 2 of the accompanying drawing. When placed in the box the edges $a$ $a'$ are to be turned down, the bent parts slipping into the cuts above described.

I prefer to make the boxes square, and of two sizes—viz., pint and quart boxes; they can, however, be made of any size and shape.

A cover, when required, is to be made and inserted in the same way as provided for the bottom of the box.

This gives a light, cheap, and easily-constructed box, which can be sent from the factory folded, and is readily adjusted when required for use.

I claim as my invention—

A fruit-box made of water-proof pasteboard or paper, having in two of its opposite sides slits $a$ $a'$, adapted to receive and firmly hold the bottom piece, which is provided with projections $a$ $a'$ to enter said slits, substantially as described.

WILLIAM W. NEIGHBOUR.

Witnesses:
 EDMUND C. GILL,
 W. FRANK BOGART.